June 3, 1930.  R. W. BAKER  1,761,032
COMMUTATOR SAWING MACHINE

Filed March 15, 1926  4 Sheets-Sheet 1

Inventor
Russell W. Baker
By Spencer Sewall & Hardman
his Attorneys

June 3, 1930.  R. W. BAKER  1,761,032
COMMUTATOR SAWING MACHINE
Filed March 15, 1926   4 Sheets-Sheet 3
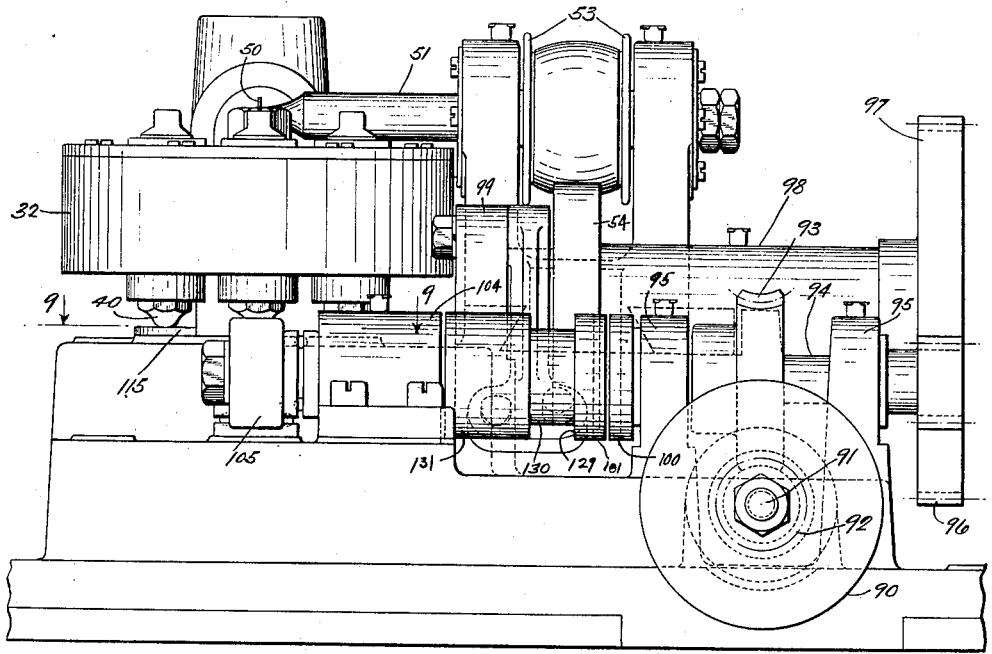
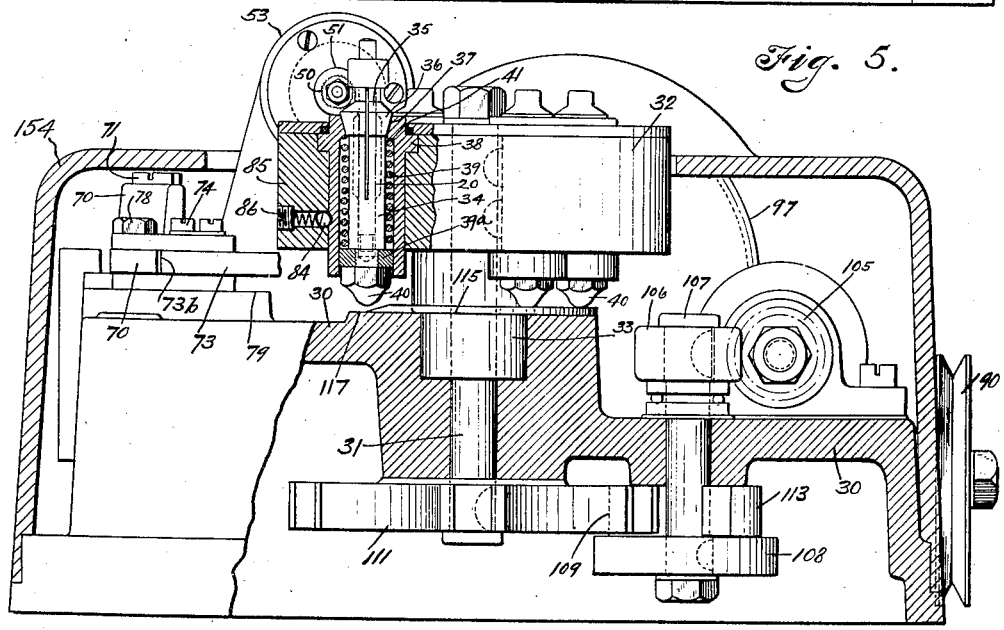
Fig. 5.
Fig. 6
Inventor
Russell W. Baker
By Spencer Small & Hardman
his Attorneys June 3, 1930. R. W. BAKER 1,761,032
COMMUTATOR SAWING MACHINE
Filed March 15, 1926 4 Sheets-Sheet 4
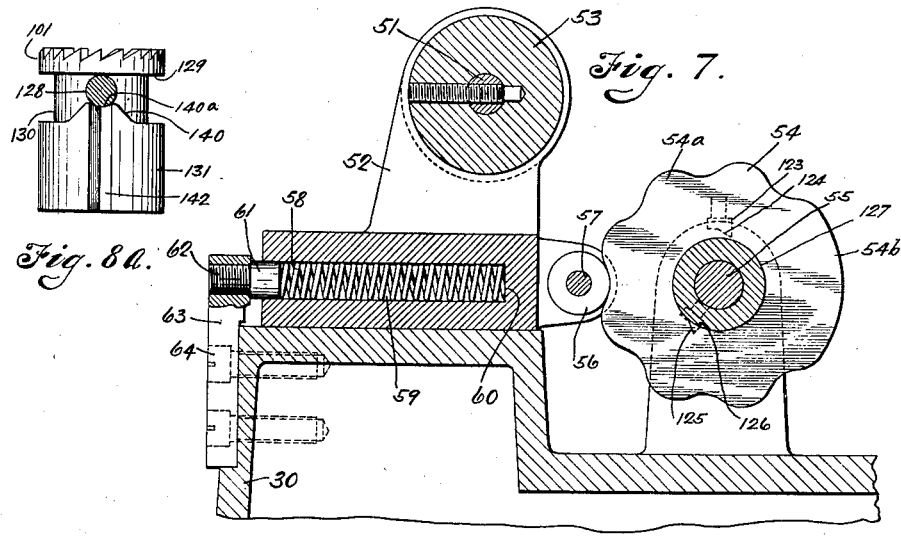
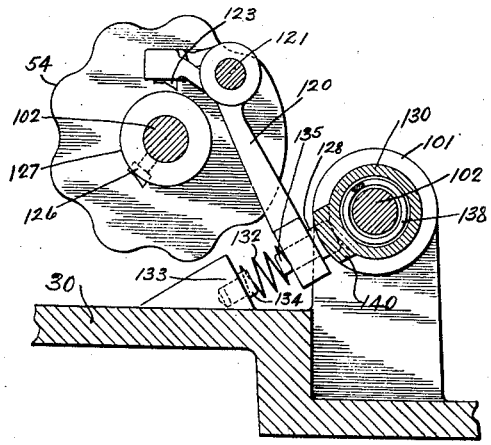
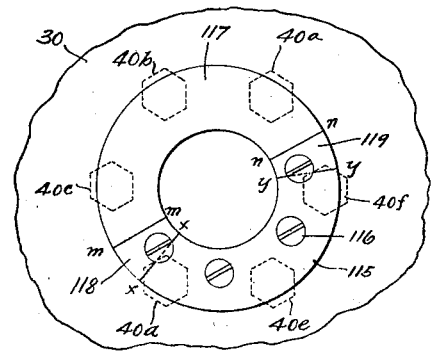
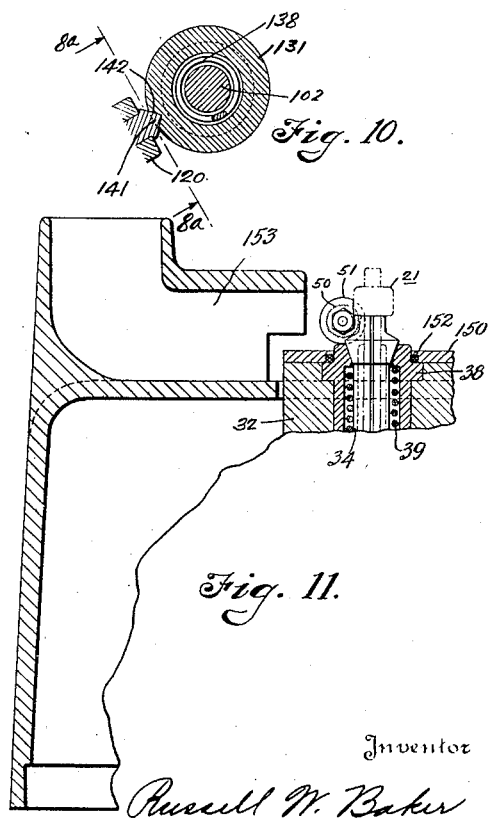

Patented June 3, 1930

1,761,032

UNITED STATES PATENT OFFICE

RUSSELL W. BAKER, OF ANDERSON, INDIANA, ASSIGNOR, BY MESNE ASSIGNMENTS, TO DELCO-REMY CORPORATION, OF DAYTON, OHIO, A CORPORATION OF DELAWARE

COMMUTATOR-SAWING MACHINE

Application filed March 15, 1926. Serial No. 94,990.

This invention relates to apparatus for providing a work piece with a series of notches or recesses and particularly to apparatus for notching commutator bars of dynamo-electric machines, for the purpose of adapting the bar to receive an armature conductor wire which is to be permanently attached to the commutator bar, for example, by soldering the wire to the bar after it has been placed in the notch.

One of the objects of the present invention is to reduce the cost of this part of the manufacture of a work piece having a series of notches or recesses adjacent one end, for example, a commutator for a dynamo-electric machine; and to this end, the invention comprises a machine by which bars of a commutator may be notched automatically, the only manipulation required of the operator being to place the commutators upon a conveyor which transfers the work from a place of loading to a place where the slotting operations are performed.

Further objects and advantages of the present invention will be apparent from the following description, reference being had to the accompanying drawings, wherein a preferred form of the present invention is clearly shown.

In the drawings:

Fig. 5 is a side view, looking in the direction of arrow 5 of Fig. 4;

Fig. 6 is a side view partly in section, looking in the direction of arrow 6 of Fig. 4.

Fig. 7 is a sectional view on the line 7—7 of Fig. 4;

Fig. 8 is a sectional view on the line 8—8 of Fig. 4;

Figure 4:
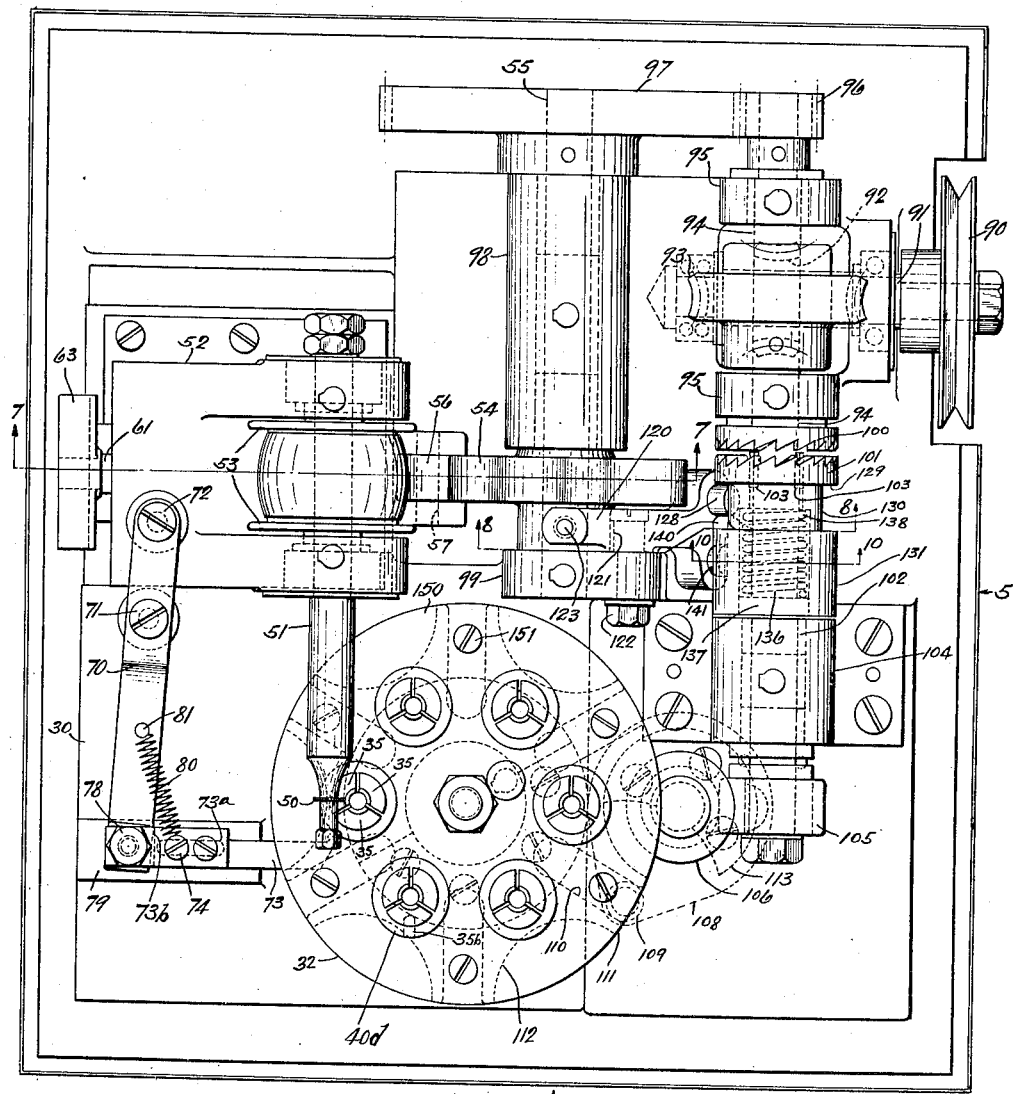
Fig. 4 is a plan view of the machine for automatically notching commutator bars.

Fig 8ª is a side view of a clutch element 101 shown in section in Fig. 8;

Fig. 9 is a plan view of the commutator-chuck-control cam, this view being taken on the line 9—9 of Fig. 5;

Fig. 10 is a sectional view on the line 10—10 of Fig. 4; and

Fig. 11 is a sectional view showing the machine housing and duct provided therein which is adapted to be connected with a suction pump for removing metal particles cut by the circle saw or disc cutter.

Figure 2:
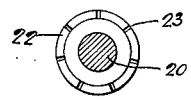
Fig. 2 is a sectional view on the line 2—2 of Fig. 1.
Figure 1:
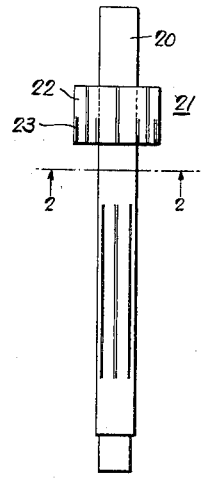
Fig. 1 is a plan view of the commutator adapted to be notched by the present machine, the commutator being assembled upon an armature shaft by which the commutator is supported by the work-transfer table of the machine.

Referring to Figs. 1 and 2, 20 designates an armature shaft carrying a commutator 21 comprising a plurality of segments 22. The machine includes, in the main, a rotatable chuck which receives the armature shaft 20, and is rotated intermittently in order to bring the commutator bars 22 successively adjacent to a rotating cutter which is bodily translatable toward and away from the commutator. In this manner, each commutator bar 22 will be provided with a notch 23 which is adapted to receive an end of an armature coil which may be permanently joined to the bar by placing solder within the notch.

The machine comprises a base 30 which supports a vertical shaft 31, as shown in Fig. 6. Shaft 31 operates a circular, work-conveying table 32 supported by a bushing 33 which is supported by the frame 30. The table 32 supports a plurality of collet chucks each adapted to receive and grip an armature shaft. Each collet chuck comprises a tubular member 34 which includes three resilient clamping elements 35 each having a conical surface 36 adapted to be received by a tapered bore 37 of a chuck shaft 38. The member 34 is slidable within the shaft 38 and one of the clamping elements 35 is provided with a slot 35ª (see Fig. 3) which receives the end of a pin 35ᵇ attached to the shaft 38. In this way, the member 34 is prevented from rotating relative to the shaft 38. The lower end of the member 34 is threaded to receive an acorn nut 40 which clamps to the member 34 a disc 39ª. A spring 39, which is located between the disc 39ª and an internal shoulder 41 of the shaft 38, maintains the conical surfaces 36 in engagement with the conical wall of the tapered bore 37 in the shaft 38, in order that the chucking members 35 will be maintained in clamping relation to the armature shaft 20. By mechanism to be described, the table 32 is intermittently rotated so as to bring each of the collet chucks successively adjacent the rotating cutter or saw 50, which is mounted on a shaft 51 supported by a slidable bracket 52 and carrying a belt-driven pulley 53 by which the shaft is operated. The saw 50 is bodily translated relative to the chuck adjacent thereto, by mechanism which includes a cam 54, shown particularly in Fig. 7. This cam is driven by a shaft 55 and is provided with six relatively narrow lobes 54$^a$ and with a relatively wide lobe 54$^b$. These lobes cooperate with a roller 56 which is mounted on a shaft 57 attached to the bracket 52. The bracket 52 is urged toward the cam 54 by a spring 58 located within a cylindrical recess 59 in the bracket 52 and located between the end 60 of the recess and the head 61 of a screw 62 attached to a bracket 63 which is secured by screws 64 to the frame 30. During each rotation of the cam 54, the saw 50 will be caused to make seven oscillations toward the work and then back again in order to notch each of the seven segments of the commutator. After the seven oscillations have been performed, the wide lobe 54$^b$ will move into engagement with roller 56 to maintain the saw in retracted position for a certain period, during which the table is rotated to bring the next succeeding piece of work adjacent the saw.

Figure 3:
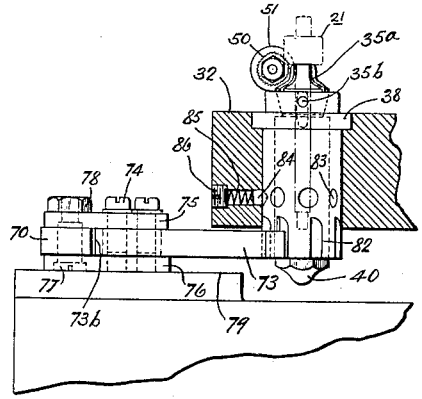
Fig. 3 is a fragmentary view of the mechanism for rotating the commutator chuck into various positions for notching its bars by a rotating cutter or saw.

Each time the bracket 52 is oscillated, a ratchet mechanism is operated in order to rotate the chuck shaft 38 the correct angular distance to bring the next succeeding commutator segment opposite the saw. Referring to Figs. 3 and 4, this ratchet mechanism comprises a lever 70 pivotally secured by a screw 71 to the frame 30, and connected by a screw 72 with the bracket 52. A pawl 73 is adjustably secured by screws 74 to two bars 75 and 76, the pawl having a slot 73$^a$ for receiving the screws and permitting endwise adjustment of the pawl. The bars 75 and 76 are located upon opposite sides of the lever 70 and receive a screw 77 which cooperates with a nut 78 for providing a pivotal connection between the lever 70 and the bars 75 and 76. The bar 76 is slidably supported by the upper surface of a boss 79 provided by the frame 30. A spring 80, which is attached by one of the screws 74 to the bar 75 and by a stud 81 to the lever 70, yieldingly maintains the pawl 73 in the position shown, with the left-hand edge 73$^b$ of said pawl bearing against the right-hand edge of the lever 70. That portion of each shaft 38 which extends below the underside of the table 32 is provided with notches 82 for receiving the pawl 73. Each shaft 38 is provided also with a series of locating depressions 83, each adapted to receive a locating ball 84 which is urged by a spring 85 toward the shaft 38, the outer end of the spring bearing against a plug 86. It is apparent, therefore, that during movement of the bracket 52 toward the left, as viewed in Fig. 4, the lever 70 will be moved counterclockwise in order to move the pawl 73 toward the right, thus causing the shaft 38 to be moved a portion of a revolution, for example, one-seventh of a revolution, in case the commutator has seven bars. During the movement of the bracket 52 toward the right, to advance the saw 50 toward the work, the pawl 73 will be retracted and will drop into the next succeeding notch 82 of the shaft 38. During this movement of the pawl 73, the shaft 38 will be prevented from turning, due to the engagement of the ball 84 with one of the depressions 83 in the shaft.

After all of the commutator bars of the commutator which is positioned adjacent the saw 50 have been notched, the table is given a partial revolution in a counterclockwise direction (as viewed in Fig. 4) in order to bring the next succeeding chuck adjacent the saw 50. Intermittent motion is imparted to the table 32 during the time the wide lobe 54$^b$ is in engagement with the roller 56.

The mechanism which rotates the table 32 and also the cam 54, comprises a belt-driven pulley 90 connected with a shaft 91 carrying a gear 92 which meshes with a gear 93 connected with a shaft 94. Shaft 94 is journaled in bearings 95 and operates a gear 96 which meshes with a gear 97, which is connected with the shaft 55 which operates the cam 54. The shaft 55 is journaled in bearings 98 and 99. The shaft 94 operates a clutch member 100 which co-operates with a slidable clutch member 101. The clutch member 101 is slidably connected with a shaft 102 by keys 103. The shaft 102 is journaled in a bearing 104 and drives a gear 105 meshing with a gear 106 connected with a vertical shaft 107. The shaft 107 drives an arm 108 which carries a roller 109 which co-operates with any of the radial grooves 110 of a Geneva gear 111. The gear 111 is connected with the lower end of the shaft 31 and is provided with arcuate notches 112 which receive the Geneva gear-locking member 113, which is attached to the arm 108. It is apparent that the shaft 102 will be driven by the shaft 94 when the clutch members 100 and 101 are connected. Since the gears 105 and 106 have a one-to-one ratio, one revolution of the shaft 102 will cause the arm 106 to make a complete revolution, during which time the roller 109 will move clockwise to produce counterclockwise rotation of the Geneva gear 111 for one-sixth of a revolution. The remainder of the revolution of the arm 108 will bring the roller again to the position shown in Fig. 4. During the motion of the table 32, as produced by the gear 111, the nuts 40 of the collet chuck members 34 will cooperate with a circular-segmental cam 115 attached by screws 116 to a plane surface 117 provided by the frame 30 underneath the table 32. The portion of the cam 115 between the radial lines X—X and Y—Y, is at a higher horizontal elevation than the mounting surface 117. The surfaces 118 and 119 defined by the lines M—M/X—X and N—N/Y—Y are inclined surfaces, merging from the segmental plane surface between X—X and Y—Y. When the collet chuck heads 40 are in the positions designed by dotted-line hexagons 40$^a$, 40$^b$ or 40$^c$ in Fig. 9, the heads 40 will be free of the cam 115 so that the spring 39 of each chuck will be released to cause the chuck to engage an armature shaft which is received by it. When the chuck heads 40 are in the positions designated by the hexagons 40$^d$, 40$^e$ or 40$^f$, the heads will be engaged by the cam 115, so that the heads will be elevated to release the conical surfaces 36 of the chuck elements 35 from the conical recess 37 of their chuck shafts 38. Therefore, three of the chucks will be in gripping engagement with the armature shafts received by them and the other three chucks will be in non-gripping engagement. The operator may then fill as many as three chucks at one time between successive movements of the table 32.

The mechanism, which controls the clutch member 101 so that the shaft 102 will make one complete revolution and then stop while the cam lobe 54$^b$ engages the roller 56, comprises a lever 120 pivoted upon a screw 121 having its shank extending through the bearing bracket 99 and co-operating with a nut 122 to secure the screw in position. The lever 120 carries a stud 123 having an inclined camming surface 124 which is adapted to co-operate with the camming surface 125 of a stud 126 which is attached to the hub 127 of the cam 54. As viewed in Figs. 4 and 8, the right-hand arm of the lever 120 carries a pin 128 which is adapted to co-operate with a shoulder 129 formed by providing a groove 130 in the hub 131 of the clutch member 101. The lever 120 is urged in a counterclockwise direction toward the shaft 102, by a spring 132 bearing against a lug 133 formed on the frame 30, as shown in Fig. 8, and against the lever 120. The spring is retained in position by a stud 134 attached to the lug 133 and by the shank 135 of the pin 128. During rotation of the shaft 55, the stud 126 will engage the stud 123 in order to move the lever 120 clockwise to retract the pin 128 from the groove 130. This will permit a spring 136, which is located between a shoulder 137 on the shaft 102 and an internal shoulder 138 provided by the sleeve 131, to be released, thereby causing the clutch 101 to move into engagement with the clutch 100. As soon as the stud 126, operated by the shaft 55, moves past the stud 123 of the lever 120, the spring 132 will be released to move the lever 120 toward the shaft 102 to cause the pin 128 to enter the groove 130. This is permitted since the groove is wide enough to receive the pin 128 in the clutched and de-clutched positions of the clutch member 101. The shaft 102 will continue to turn until a cam 140 provided by the sleeve 131, engages the pin 128 and thereupon causes the sleeve 131 and clutch member 101 to move away from the clutch member 100. By the time the shaft 102 has made one complete revolution, the clutch members will be disengaged and the pin 128 will engage a dwell surface 140$^a$ on the cam 140. The shaft 102 will be located at a predetermined point at the end of one revolution, by means which includes a chisel-pointed lug 141 attached to the lever 120 and urged by the spring 132 into a V-groove 142 provided by the sleeve 131.

From the foregoing it is apparent that the operator of this machine is required only to remove the notched commutators from the collet chucks and apply unnotched commutators thereto when the chucks arrive in the positions indicated by hexagons 40$^d$, 40$^e$ and 40$^f$ in Fig. 9. As the table is intermittently turned, the chucks will be released to grip the armature shafts so that the commutators may be turned by the ratchet mechanism. The table is automatically turned to bring the work successively adjacent the saw 50. Each commutator is automatically rotated about its own axis in order to bring the commutator segments successively opposite the saw which is advanced to cut a notch and then retracted to permit indexing the commutator. After all of the commutator segments have been slotted, the table is automatically turned in order to bring the next unfinished piece of work adjacent the saw. The machine operates continuously without manipulation by the operator, except to unload and reload the chucks.

The chuck shafts 38 are retained by a plate 150 attached by screws 151 to the table 32. Felt washers 152 are located between the plate 150 and a flange of each shaft 38 for the purpose of excluding fine metal cuttings from the journal of the shaft 38. As viewed in Fig. 11, the saw 50 rotates clockwise so that the metal cuttings will be directed from the rapidly moving saw teeth against the plate 150 and then be deflected into a duct 153 which is integral with a machine cover 154. The duct 153 may be connected with a dust suction fan.

In the claims which follow the terms "commutator" and "commutator bar" are used to illustrate the type of work which may be performed by applicant's machine; but it should be understood that the machine is capable of other uses and that the claims cover a machine for operating upon any sort of work piece, a commutator being recited as an example.

While the form of embodiment of the invention as herein disclosed, constitutes a preferred form, it is to be understood that other forms might be adopted, all coming within the scope of the claims which follow.

What is claimed is as follows:

1. A machine for notching a work piece such as a commutator comprising, in combination, a conveyor carrying a plurality of rotatable work holders each so constructed and arranged as to rotatably support a commutator, a notching saw, automatic means for moving the saw bodily relative to a commutator, automatic spring urged reciprocating means for intermittently rotating each work holder to locate the bars of the commutator supported thereby successively adjacent the saw, and means for moving the conveyor after the notching operation of all the bars of a single commutator has been completed to locate another commutator work holder adjacent the notching saw.

2. A machine, such as defined by claim 1, in which the work holders are rotatable chucks, in which the commutator rotating means includes a device which co-operates with each chuck while it is located adjacent the saw, and in which rotary movement is imparted to the chuck from the bodily movement of the saw.

3. A machine for notching a work piece such as a commutator comprising, in combination, a rotatable table, carrying a plurality of rotatable collet chucks so constructed and arranged as to grip the commutators, each chuck having its axis parallel to the axis of rotation of said table and having a portion thereof extending from the table, said portion being adapted to be engaged to release the chuck, a rotating notching saw, means for moving the saw bodily relative to the adjacent commutator, means for intermittently turning the chuck adjacent the saw in order that the commutator bars will be successively notched, means for automatically turning the table to move an unnotched commutator adjacent the saw after all the bars of a preceding commutator have been notched; and means for engaging the portion of each collet chuck that extends from the table after the table has been moved so as to move said portion from its position adjacent the saw whereby the chuck grip on the work pieces is relieved.

4. A machine for notching a work piece such as a commutator, comprising in combination, a conveyor carrying a plurality of work holders each adapted to support a commutator; driving means for periodically operating the conveyor through a portion of its cycle, said means including a Geneva gear and a clutch member; and means operated by the driving means for controlling the clutch member.

5. A machine for notching a work piece such as a commutator, comprising in combination, a conveyor carrying a plurality of work holders each adapted to support a work piece; a drive shaft; a driven shaft; a Geneva gear connecting the driven shaft and the conveyor for operating the conveyor periodically through a portion of its cycle; a clutch comprising two members one of which is secured to the drive shaft, the other being slidably mounted upon the driven shaft; a clutch controlling device operated by the drive shaft and adapted intermittently to move the clutch member on the driven shaft out of engagement with the clutch member on the drive shaft; and a spring for moving said slidably mounted clutch member into engagement with the other clutch member.

6. A machine for notching a work piece such as a commutator comprising in combination, a rotatable table having a plurality of work holders rotatably supported thereon; a drive shaft; a cam shaft driven by the drive shaft and having a cam mounted thereon; a notching saw carried on a shaft journalled in a slidable bearing block which is engaged by the cam and periodically operated thereby to move the notching saw away from the work holder; a spring in said slidable bearing block for moving the saw toward the work holder; and means operated by the bearing block to rotate each work holder as it is moved into a proper position relative to the saw.

7. A machine for notching a work piece such as a commutator comprising in combination, a conveyor carrying a plurality of work holders rotatable therein, each adapted to support a commutator; means for notching the bars of the commutator; means for operating the conveyor at proper intervals to successively bring the work holders into proper position relative to the notching means; and reciprocating means engaged by each work holder as it is moved into the said position relative to the notching means, to rotate the work holder periodically through a portion of its range.

8. A machine for notching a work piece such as a commutator comprising in combination, a rotatable table; a plurality of work holders each adapted to support a commutator, rotatably supported on said table, in a circular row and equally spaced, each work holder having a portion provided with equally spaced notches; means for notching the commutator bars; means for operating the table at proper intervals to successively bring the work holders into proper position relative to the notching means; a ratchet adapted to engage the notched portion of each work holder as the work holders are moved into proper position relative to the notching means; and means for operating the ratchet at proper intervals and through a proper range to rotate the engaged work holder a distance equal to the spacing of the notches therein.

9. A machine for notching a work piece such as a commutator comprising in combination, a base; a table rotatably supported on the base; a plurality of work holders rotatably supported on said table each work holder having a shank portion extending from the table, and provided with properly spaced notches; a bearing block slidably supported on the base; a lever pivoted on the base, one end of which is secured to the bearing block, the other being provided with a pawl which is adapted to engage the notched shank of each work holder as it is moved into proper position by the rotation of the table; a shaft journalled in said slidable bearing block; a notching saw on said shaft adapted to be moved into proper position relative to the work holder engaged by the pawl; a spring in the bearing block for moving said block so that the saw approaches the work holder; and a drive shaft carrying a cam which engages the slidable bearing block for periodically operating it to move the notching saw away from the work holders and to operate the pivoted lever to rotate said work holder.

10. A machine for notching a work piece such as a commutator comprising in combination, a base; a table rotatably mounted on said base; means including a clutch for periodically rotating said table through a portion of its cycle; a plurality of workholders rotatably supported by the table, equally spaced and in a circular row, said work holders each comprising a spring loaded collet chuck adapted to grip a commutator; a saw for notching the work; means for intermittently rotating a chuck while adjacent the saw; means for moving the saw relative to the work; and an arcuate cam concentric with the table for engaging the collet chucks to operate them to release the commutators in response to the movement of the table.

11. A machine for notching a work piece such as a commutator comprising in combination, a base; a table rotatably mounted on said base; means for periodically rotating said table through a portion of its cycle; a plurality of work holders rotatably supported by the table, equally spaced and in a circular row, said work holders each comprising a collet chuck including a chuck shell rotatably supported in the table and having one end extending from the table and provided with equally spaced notches in its outer surface, the other end having an inwardly extending, annular flange the inner surface of which tapers inwardly toward the notched end; an expansible gripping core adapted to receive a commutator, said core having a tapered head fitting into the tapered aperture formed by the flange on the chuck shell; a spring interposed between the flange and a shoulder on the core, for normally contracting the gripping core; a cam-follower nut on the end of the core, extending from the chuck shell; a cam on the base adapted to engage the said nuts on the respective chucks to hold them expanded during a certain portion of the range of table rotation; and a reciprocating ratchet pawl for engaging the notched chuck shell for intermittently rotating the chuck.

12. A machine for notching a work piece such as a commutator comprising in combination, a rotatable table carrying a plurality of rotatable work holders; a driven shaft having a spring loaded slidable clutch member and a Geneva gear for rotating the table periodically through a portion of its cycle; a slidable block providing a journal for a shaft upon which is mounted a notching saw, said block being movable to bring the saw into proper position relative to a work holder which has been moved into a proper position by the rotation of the table; a pivoted lever operated by the slidable block when it is operated to move the saw away from the work holder, said pivoted lever rotating the work holder through a portion of its cycle; a drive shaft having a clutch member adapted to be engaged by the spring loaded clutch member on the driven shaft; and an intermediate shaft driven by the drive shaft and having a cam which intermittently operates the slidable block to move the saw toward the work holder, said cam periodically releasing the spring loaded clutch member to drivingly connect it with the driving shaft.

13. A machine for notching a work piece such as a commutator comprising in combination, a conveyor carrying a plurality of work holders rotatable therein, each adapted to support a commutator; means for notching the bars of the commutator; driving means for periodically operating the conveyor through a portion of its cycle so as to move a work holder into position relative to the notching means, said driving means including a Geneva gear and a clutch member; and means engaged by each work holder as it is moved into position relative to the notching means to rotate the work holder periodically through a portion of its range.

14. A machine for notching a work piece such as a commutator comprising in combination, a base; a table rotatably mounted on said base; driving means for periodically rotating said table through a portion of its cycle, said means including a Geneva gear and a clutch member; a plurality of work holders rotatably supported by the table, equally spaced in a circular row, said work holders each comprising a spring loaded collet chuck adapted to grip the commutator; a camming ring secured to the base for engaging certain of the collet chucks to operate them to release the commutators while the table moves through a portion of its range of travel; and means for notching a commutator while gripped by one of the chucks.

15. A machine for notching a work piece such as a commutator comprising in combination, a base; a table rotatably mounted on said base; driving means for periodically rotating said table through a portion of its cycle, said driving means including a clutch member; means operated by the driving means for controlling the clutch member; a plurality of work holders rotatably supported by the table, equally spaced and in a circular row, said work holders each comprising a spring loaded collet chuck adapted to grip the commutator; a camming ring secured to the base for engaging certain of the collet chucks to operate them to release the commutators while the table moves through a portion of its range of travel; and means for notching a commutator while gripped by one of the chucks.

In testimony whereof I hereto affix my signature.

RUSSELL W. BAKER.